P. A. Oliver.
Making Gunpowder.
No. 3,209. Reissued Nov. 24, 1868.
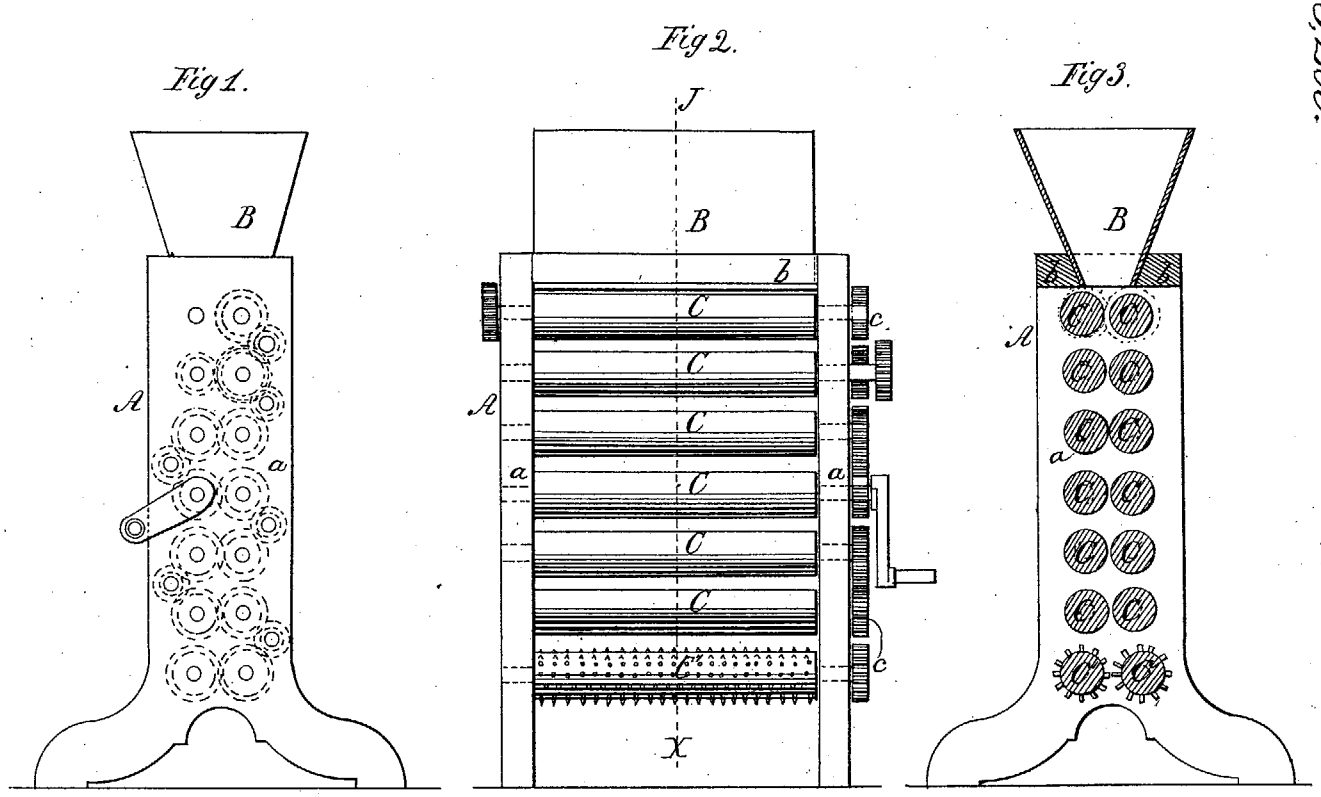
Witnesses:
Of. C. Ashkettle
Wm A Morgan.
Inventor:
Paul. A. Oliver.
per Munn & Co
attys.
N. PETERS, PHOTO-LITHOGRAPHER, WASHINGTON, D. C.

United States Patent Office.

PAUL A. OLIVER, OF NEW YORK, N. Y.

*Letters Patent No.* 76,510, *dated April* 7, 1868; *reissue No.* 3,209, *dated November* 24, 1868.

IMPROVED MACHINE FOR THE MANUFACTURE OF GUNPOWDER.

The Schedule referred to in these Letters Patent and making part of the same.

*To all whom it may concern:*

Be it known that I, PAUL A. OLIVER, of the city, county, and State of New York, have invented a new and useful Improvement in Machinery for the Manufacture of Gunpowder; and I do hereby declare that the following is a full, clear, and exact description thereof, which will enable others skilled in the art to make and use the same, reference being had to the accompanying drawings, forming part of this specification.

This invention relates to a new and improved machine for combining and incorporating the ingredients of gunpowder, and also for granulating or separating the ingredients into small lumps when incorporated.

The object of this invention is to obtain an economical device, whereby the above result may be obtained within a comparatively small compass, and one which will be continuous in its operation, the present Chilian mill, which is now commonly used, being very cumbersome and expensive, and not continuous in its operation.

In the accompanying sheet of drawings—

Figure 1 is a side view of my invention.

Figure 2, a front view of the same.

Figure 3, a vertical section of the same, taken in the line *x x*, fig. 2.

Similar letters of reference indicate corresponding parts.

A represents a frame, composed of two uprights, *a a*, connected at their upper ends by cross-pieces, *b b*, between which the lower part of a hopper, B, is fitted.

C represents a series of rollers, which are arranged in pairs in the frame A, one pair above the other, the axes of each pair being in a horizontal plane, as shown clearly in fig. 3.

These several pairs of rollers are connected at one end by gears *c*, as shown in fig. 2, and in red outline in fig. 1.

I design, in practice, to have the journals of one roller of each pair fitted in adjustable bearings, so that the space between each pair of rollers may be varied in width, as desired; and I further design to have one or more pairs of rollers so geared that one roller will have a rather greater speed than the other.

The same result may be obtained by having one roller made of greater diameter than the other.

By this means the rollers thus arranged will have a rubbing or grinding, as well as a crushing or compressing action. I do not, however, confine myself to either of the above methods of arranging the operation of the rollers, nor to any particular speeding of either of the rollers. In the manufacture of some kinds of powder, plain rollers, running at equal speeds, may be employed.

The lower pair of rollers, designated by C′, is provided with teeth *c*.

The ingredients, sulphur, saltpetre, and charcoal, are pulverized, mixed, and water added to them, as usual, and put into the hopper B, from which they pass down between the several pairs of rollers C, whereby the different ingredients are crushed and thoroughly incorporated.

The moist ingredients, in consequence of being thus crushed and ground and incorporated together, will be discharged from the lower pair of rollers C in a cakey mass, and the office of the rollers C′ is to break this cakey mass into small lumps.

By my improvement, it will be seen that the operation is a continuous one, the device not requiring to be stopped for any cause, and working continually, so long as the ingredients are fed into the hopper. Any required pressure upon the ingredients may be obtained by adjusting the rollers nearer together or further apart.

I do not confine myself to any particular number of pairs of rollers, for one pair or more may be used, according to the kind of powder to be made.

Having thus described my invention,

I claim as new, and desire to secure by Letters Patent—

In the manufacture of gunpowder, the employment of one or more pairs of rollers, substantially as herein described.

Also, the combination with the said rollers of a pair of toothed rollers, substantially as herein described.

Also, as an improved article of manufacture, a machine for making gunpowder, consisting of a series of rollers, operating substantially as described, so as to deliver the ingredients from one pair of rollers to the next pair, and so on, as herein set forth.

Witnesses: PAUL A. OLIVER.

A. E. BEACH,

ALEX. F. ROBERTS.